US012146327B2

(12) United States Patent
Lin et al.

(10) Patent No.: US 12,146,327 B2
(45) Date of Patent: Nov. 19, 2024

(54) ANTI-CRACKING ASSEMBLY STRUCTURE FOR DOOR AND WINDOW CORNER WALL AND ANTI-CRACKING COMPONENT THEREOF

(71) Applicants: Chih-Cheng Lin, Tainan (TW); Chuan-Hsuan Lin, Tainan (TW)

(72) Inventors: Chih-Cheng Lin, Tainan (TW); Chuan-Hsuan Lin, Tainan (TW)

( * ) Notice: Subject to any disclaimer, the term of this patent is extended or adjusted under 35 U.S.C. 154(b) by 167 days.

(21) Appl. No.: 17/874,971

(22) Filed: Jul. 27, 2022

(65) Prior Publication Data

US 2023/0279677 A1 Sep. 7, 2023

(30) Foreign Application Priority Data

Mar. 1, 2022 (TW) ................................. 111107378

(51) Int. Cl.
*E04G 15/02* (2006.01)
*E04C 5/16* (2006.01)
(Continued)

(52) U.S. Cl.
CPC ................ *E04G 15/02* (2013.01); *E04C 5/16* (2013.01); *E04F 13/06* (2013.01); *E06B 1/02* (2013.01)

(58) Field of Classification Search
CPC ... E04G 15/02; E04C 5/16; E06B 1/02; E04F 13/06
(Continued)

(56) References Cited

U.S. PATENT DOCUMENTS 1,979,701 A * 11/1934 Merryweather ........ E04F 13/04 52/85
2,442,929 A * 6/1948 Marino .................. E04F 13/04 52/85
(Continued)

FOREIGN PATENT DOCUMENTS

CN 211775119 U 10/2020
JP 6828196 B1 2/2021
(Continued)

OTHER PUBLICATIONS

Machine translation of TWI695106B Jun. 1, 2020 by Lin Cheng.*
Machine translation of TWI650468B Feb. 11, 2019 by Lin Cheng.*

*Primary Examiner* — Paola Agudelo
(74) *Attorney, Agent, or Firm* — Rosenberg, Klein & Lee

(57) ABSTRACT

The present invention relates to an anti-cracking assembly structure for door and window corner wall and anti-cracking component thereof. The anti-cracking components of the anti-cracking assembly structure for door and window corner wall has a plurality of protruding ribs and grooves formed at intervals on a surface thereof. The protruding ribs and grooves are arc-shaped and arranged in parallel to each other. When the reinforced concrete wall is subjected to an external force and stress is generated at the corner of the door and window frames, the stress can be guided along the arc-shaped protruding ribs and arc-shaped grooves on the surface of anti-cracking component to change the transmission direction of the force at the stress end, so as to transmit and disperse the stress to the peripheral side more quickly. Accordingly, it can more effectively prevent the occurrence of 45-degree shear cracks at the corners.

5 Claims, 10 Drawing Sheets

(51) Int. Cl.
*E04F 13/06* (2006.01)
*E06B 1/02* (2006.01)

(58) Field of Classification Search
USPC ........................................................ 52/203
See application file for complete search history.

(56) References Cited

U.S. PATENT DOCUMENTS

| | | | | |
|---|---|---|---|---|
| 4,490,953 | A * | 1/1985 | Meola | E04F 13/06 52/211 |
| 5,699,638 | A * | 12/1997 | Maylon | E04F 13/06 52/417 |
| 6,601,361 | B2 * | 8/2003 | Seibert | E04B 1/7608 52/712 |
| 7,874,123 | B2 * | 1/2011 | Maziarz | E04F 17/08 52/741.41 |
| 8,511,867 | B1 * | 8/2013 | Tam | F21S 8/026 362/147 |
| 8,615,950 | B1 * | 12/2013 | Gomes | E04F 13/04 52/255 |
| D739,039 | S * | 9/2015 | Gomes | D25/138 |
| 2006/0254169 | A1 * | 11/2006 | McFadden | E04F 13/06 52/344 |
| 2007/0204535 | A1 * | 9/2007 | Hughes | E06B 1/02 52/215 |
| 2010/0325984 | A1 * | 12/2010 | Richardson | E06B 1/02 52/215 |
| 2016/0108612 | A1 * | 4/2016 | Zhou | E04C 2/205 52/506.05 |
| 2017/0037638 | A1 * | 2/2017 | Gomes | E04F 13/06 |

FOREIGN PATENT DOCUMENTS

| | | |
|---|---|---|
| TW | I650468 B | 2/2019 |
| TW | M582057 U | 8/2019 |
| TW | I695106 B | 6/2020 |

* cited by examiner

ANTI-CRACKING ASSEMBLY STRUCTURE FOR DOOR AND WINDOW CORNER WALL AND ANTI-CRACKING COMPONENT THEREOF

BACKGROUND OF THE PRESENT INVENTION

Field of Invention

The present invention relates to the technical field of building components, and in particular to an anti-cracking assembly structure for door and window corner wall and an anti-cracking component thereof.

Description of Related Art

When a building expands with heating and contracts with cooling or is shaken by earthquakes, cracks are likely to occur at the corners of the window frames of the walls, rendering rainwater to seep into the room through the cracks. Therefore, the inventor of the present invention has developed "Anti-cracking Component of Structural Wall for Window Coiner" of Taiwan Pat. Pub. No. I650468B, as illustrated in FIG. 6, wherein an anti-cracking component of a structural wall for window corner (a) comprises a first piece portion (a1), a second piece portion (a2) perpendicularly connected and integrally formed with the first piece portion (a1), and a plurality of holes (a3), arranged on the first piece portion (a1) and the second piece portion (a2) for positioning rods (a4) to be penetrated therethrough, so as to nail the anti-cracking component of the structural wall for window corner (a) on a formwork at the corner of the window frame. Then concrete grouting is performed, so that the anti-cracking component of the structural wall for window corner (a) is wrapped in the wall to absorb the stress generated by the wall of the corner of the window frame when an earthquake or other incident occurs, so as to avoid wall cracking.

However, when the "An Anti-cracking Component of Structural Wall for Window Corner" of the Taiwan Pat. Pub. No. I650468B is utilized, the positioning rods (a4) nailed into the formwork have been found vulnerable to vibration and fallen off. The daughter of the inventor of this invention has developed "Fixing Structure for Anti-cracking Component of Window Corner Wall" in Taiwan Pat. Pub. No. M582057U, as illustrated in FIG. 7, wherein a fixing structure for anti-cracking component of window corner wall (b) is mainly movably provided with a number of positioning rods (b2) through the anti-crack component (b1), and a band (b3) bound around the positioning rods (b2). In this way, the positioning rods (b2) are bound and fixed by the band (b3), so that the positioning rods (b2) can be prevented from falling unexpectedly during the installation process, so as to facilitate the construction personnel to nail each positioning rod (b2) into the formwork.

Furthermore, referring to FIG. 8, when Taiwan Pat. Pub. No. I650468B "Anti-cracking Component of Structural Wall for Window Coiner" and Taiwan Pat. Pub. No. M582057U "Fixing Structure for Anti-cracking Component of Window Corner Wall" are installed and utilized, when an anti-crack component (b1) is secured on the formwork and longitudinal steel bars (c) are arranged around the window frame, the construction personnel must climb to a high place by means of a ladder frame, so as to penetrate the longitudinal steel bars (c) from top to bottom through the gap formed by the two fixing rods (b4). Therefore, the installation process requires the construction personnel to carry the steel bars (c) and climb the ladder frame back and forth, and thread several steel bars (c) one by one from top to bottom, which is extremely time-consuming and labor-intensive, which greatly reduces the on-site construction efficiency. Therefore, the present inventor has further developed Taiwan Pat. Pub. No. I695106B, entitled "Anti-cracking Assembly Structure for Door and Window Corner Walls", as illustrated in FIG. 9. An anti-cracking assembly structure for door and window corner walls (d) has a notch (d13) formed at the connection between a first piece portion (d11) and a second piece portion (d12) of an anti-crack component (d1), two adjacent fixing holes (d14) arranged at end edges of the first piece portion (d11) and the second piece portion (d12) at the two sides of the notch (d13), a fixing rods (d2) fixedly inserted into each of the two fixing holes (d14), and a plurality of positioning holes (d15) provided in the operation area (d3) jointly defined by the two fixing rods (d2) and the first piece portion (d11) and the second piece portion (d12) passed through thereby, so as for the positioning rod (d4) to movably penetrate therethrough to be fixed on a formwork. Accordingly, referring to FIG. 10, when the anti-cracking assembly structure for door and window corner walls (d) is installed at the frame corners of a door or window frame (e), and then steel bars (f) are arranged around the door or window frame (e), the steel bar (f) can be directly placed into a steel bar resting area (d5) formed and defined among outer edges of the first piece portion (d11), the second piece portion (d12), and the adjacent fixing rods (d2) to abut against the fixing rods (d2). Therefore, the installation of the steel bars (f) can be completed quickly and conveniently, and the on-site construction efficiency can be greatly improved.

Accordingly, it can be seen from the research and development process of the above-mentioned inventors that the inventors of the present invention utilize their products in practice, and continue to discover the features of their products to be further refined and improved, to strive to make their products more usable and practical. Recently, the inventors of the present invention discovered that the above-mentioned patent, Japanese Patent No. 6828196B1 "Door Window Corner Wall Crack Prevention Assembly Structure", China Patent No. CN211775119U "Door and Window Corner Wall Crack Prevention Component Structure", and other previously developed products show low efficiency in conducting and dispersing stress, rendering defects such as 45-degree shear cracks at the corners of the wall structure of the door and window frame, even though they have provided concave-convex creases formed on the surface of the component for transmitting and dispersing stress. Those inventions are therefore not ideal. Hence, in line with the concept of keeping improving to make the products more perfect, the present invention has been developed after ingenious thinking and experiments.

SUMMARY OF THE INVENTION

A main object of the present invention is to provide an anti-cracking assembly structure for door and window corner wall and anti-cracking component thereof, wherein the anti-crack component has a plurality of arc-shaped protruding ribs and grooves that are arranged in parallel to each other on the surface thereof to facilitate the rapid transmission and dispersion of stress, and effectively prevent the occurrence of 45-degree shear cracks at the corners of the wall structure of doors and window frames, and etc.

DETAILED DESCRIPTION OF THE PREFERRED EMBODIMENT

Figure 1:
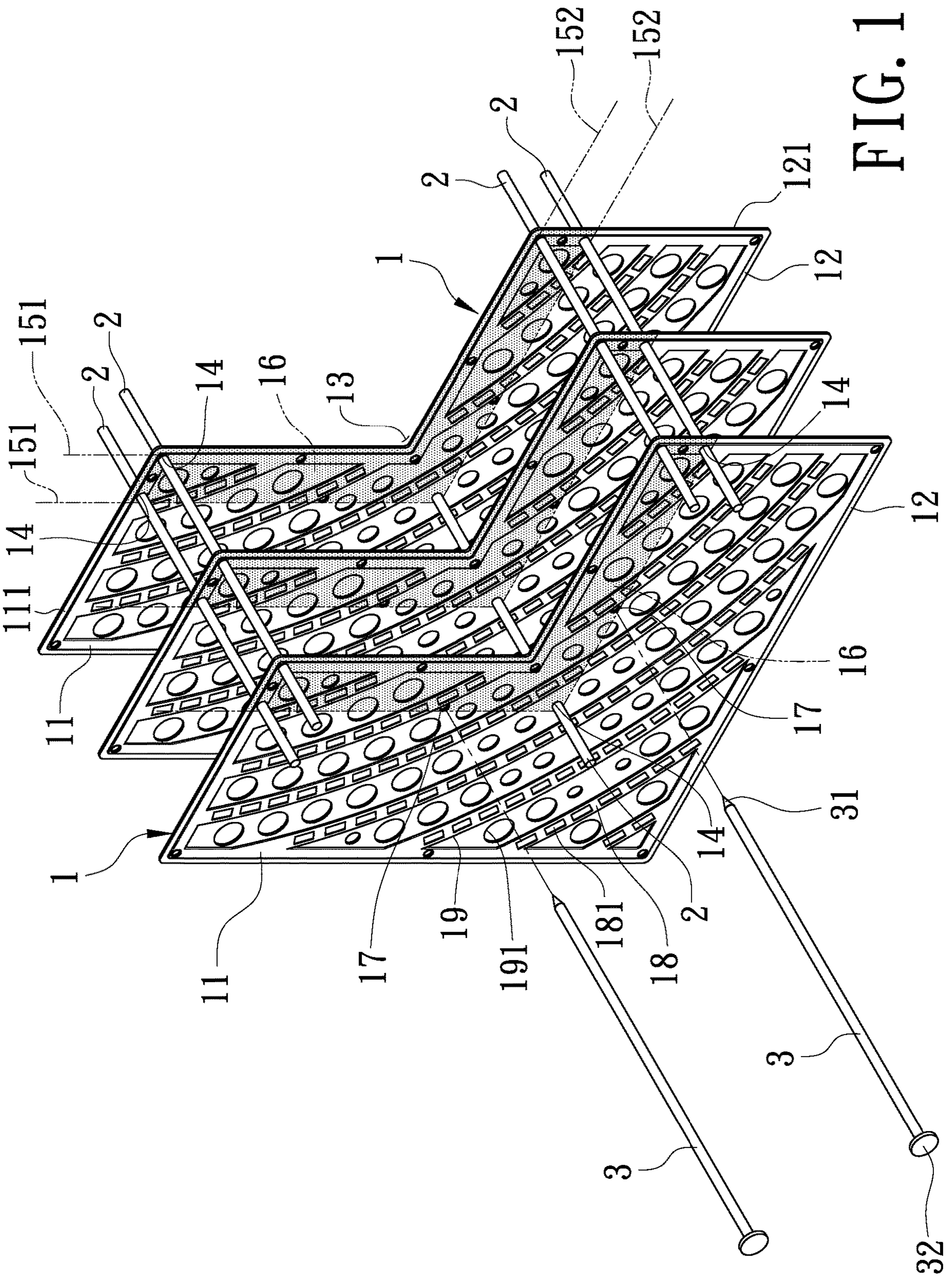
FIG. 1 is an exploded view of the present invention.
Figure 2:
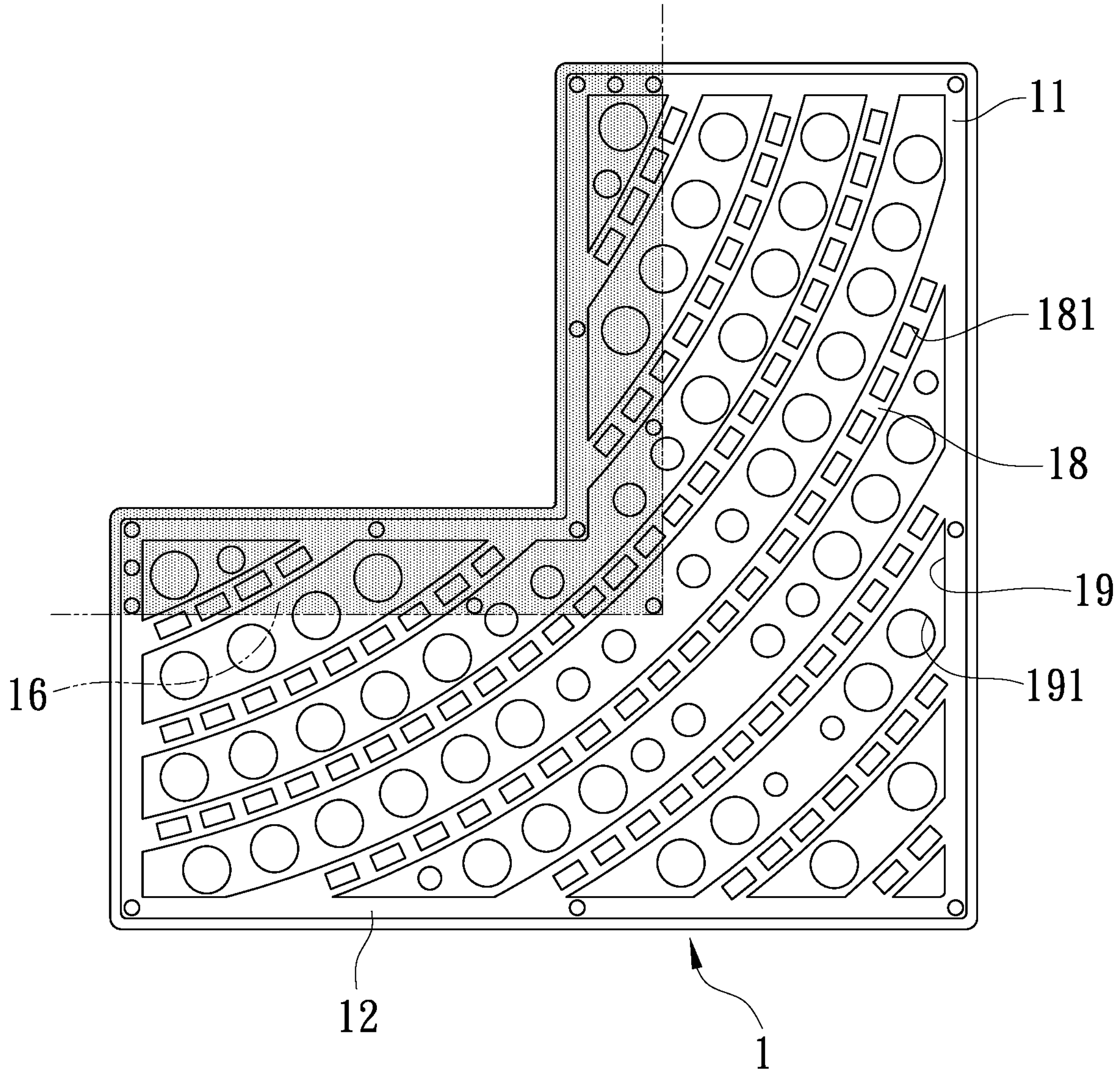
FIG. 2 is a front view of the present invention.

Referring to FIG. 1, an anti-cracking assembly structure for door and window corner wall according to an embodiment of the present invention mainly comprises:

a plurality of anti-cracking components (1), spacingly arranged and corresponding to each other, wherein each of the anti-cracking components (1) comprises a first piece portion (11) arranged longitudinally, a second piece portion (12) arranged laterally, a right-angled notch (13) formed on one side of the first piece portion (11) and the second piece portion (12), and at least two adjacent fixing holes (14) respectively provided at end edges (111) and (121) of the first piece portion (11) and the second piece portion (12) at the side of the notch (13), wherein the first piece portion (11) and the second piece portion (12) are perpendicularly connected and integrated into an L-shaped structure, wherein one of the fixing holes (14) is located at the corner of the side of the notch (13);

a plurality of fixing rods (2), each penetrated and secured in the two fixing holes (14) correspondingly arranged in the first piece portion (11) and the second piece portion (12) of each of the anti-cracking components (1), wherein the first piece portion (11) has two virtual longitudinal sidelines (151) defined thereon and longitudinally passing through the two fixing holes (14) and the fixing rods (2), and the second piece portion (12) has two virtual lateral sidelines (152) defined thereon and laterally passing through the two fixing holes (14) and the fixing rods (2), wherein each of the anti-cracking components (1) also has an operation area (16) defined and formed by the two longitudinal sidelines (151), the two lateral sidelines (152), and the end edges (111) and (121) of the first piece portion (11) and the second piece portion (12), wherein the operation area (16) has at least one positioning hole (17) arranged therein; and at least one positioning rod (3), inserted through the positioning holes (17) of the anti-cracking components (1) that are correspondingly arranged, wherein the positioning rod (3) is iron nail, so that the two opposite ends of the positioning rod (3) respectively form a sharp end (31) and a stop end (32), wherein according to the main embodiments of the present invention, the operation area (16) of the anti-cracking components (1) has several positioning holes (17) and at least one fixing hole (14) arranged on, wherein the positioning rods (3) are respectively pierced through the positioning holes (17) corresponding to the operation areas (16) of the anti-cracking components (1), wherein the rod wall of each positioning rod (3) abuts against the corresponding hole wall of each positioning hole (17), wherein each fixing hole (14) corresponding with the operation area (16) of the anti-cracking components (1) has one fixing rod (2) passed through and fixed, wherein referring to FIG. 2, the anti-cracking components (1) comprises a plurality of protruding ribs (18) and grooves (19) spacingly formed and arranged on a surface of the anti-cracking components (1), wherein the grooves (19) are respectively formed between two adjacent protruding ribs (18), wherein the protruding ribs (18) and the grooves (19) on the surface of the anti-cracking components (1) are arc-shaped and arranged in parallel to each other, wherein the protruding ribs (18) and the grooves (19) of the anti-cracking components (1) are formed and arranged in a concentric manner, and are formed by circular arcs with increasing diameters from the center to the outside thereof, wherein the protruding rib (18) comprises a plurality of reinforcement dimples (181) arranged thereon along the length direction thereof, and the groove (19) has a plurality of through holes (191) arranged thereon along the length direction thereof.

Figure 3:
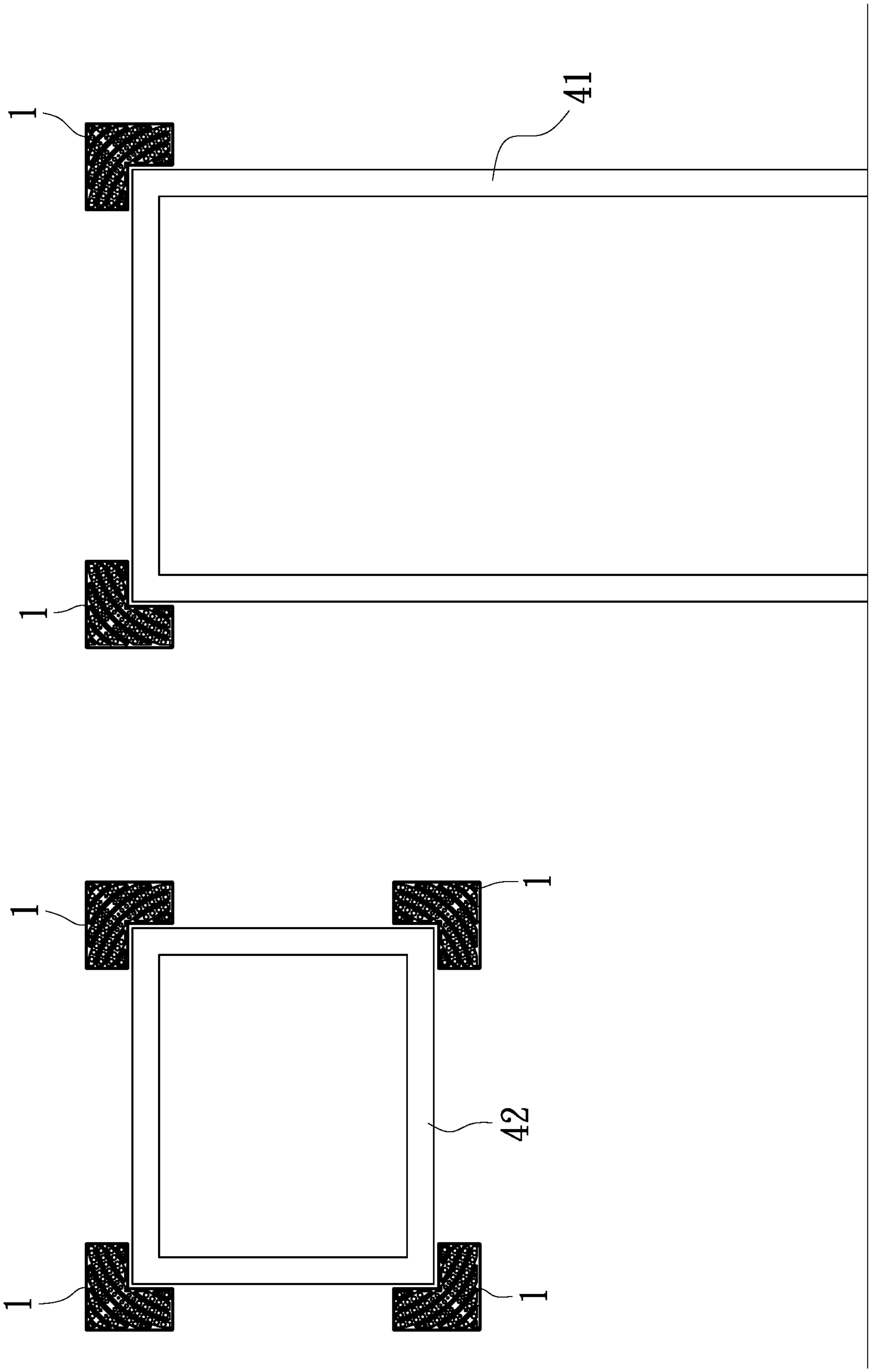
FIG. 3 is a perspective view of an assembly structure mounted on a door frame and a window frame in use according to the present invention.

To implement the present invention, referring to FIGS. 3, the present invention may be utilized on an outer side of a frame corner of a door frame (41) or a window frame (42), and the notch (13) of each of the anti-cracking components (1) of the present invention is corresponding to the frame corner position of the door frame (41) or window frame (42), wherein an end of each of the fixing rods (2) is pressed against the formwork, and the sharp ends (31) of the positioning rods (3) are respectively inserted into the formwork, and then the stop ends (32) of the positioning rods (3) are beaten by the subsequent construction personnel with a hammer or other percussion tool, so that the sharp ends (31) of the positioning rods (3) are nailed and fixed in the formwork. Since the present invention has the rod walls of the positioning rods (3) abut against the hole walls of the positioning holes (17), the positioning rods (3) passing through the positioning holes (17) can be maintained, and will not fall off due to vibration force generated when other positioning rods (3) are knocked and fixed, which improves the convenience of the present invention in installation.

Figure 4:
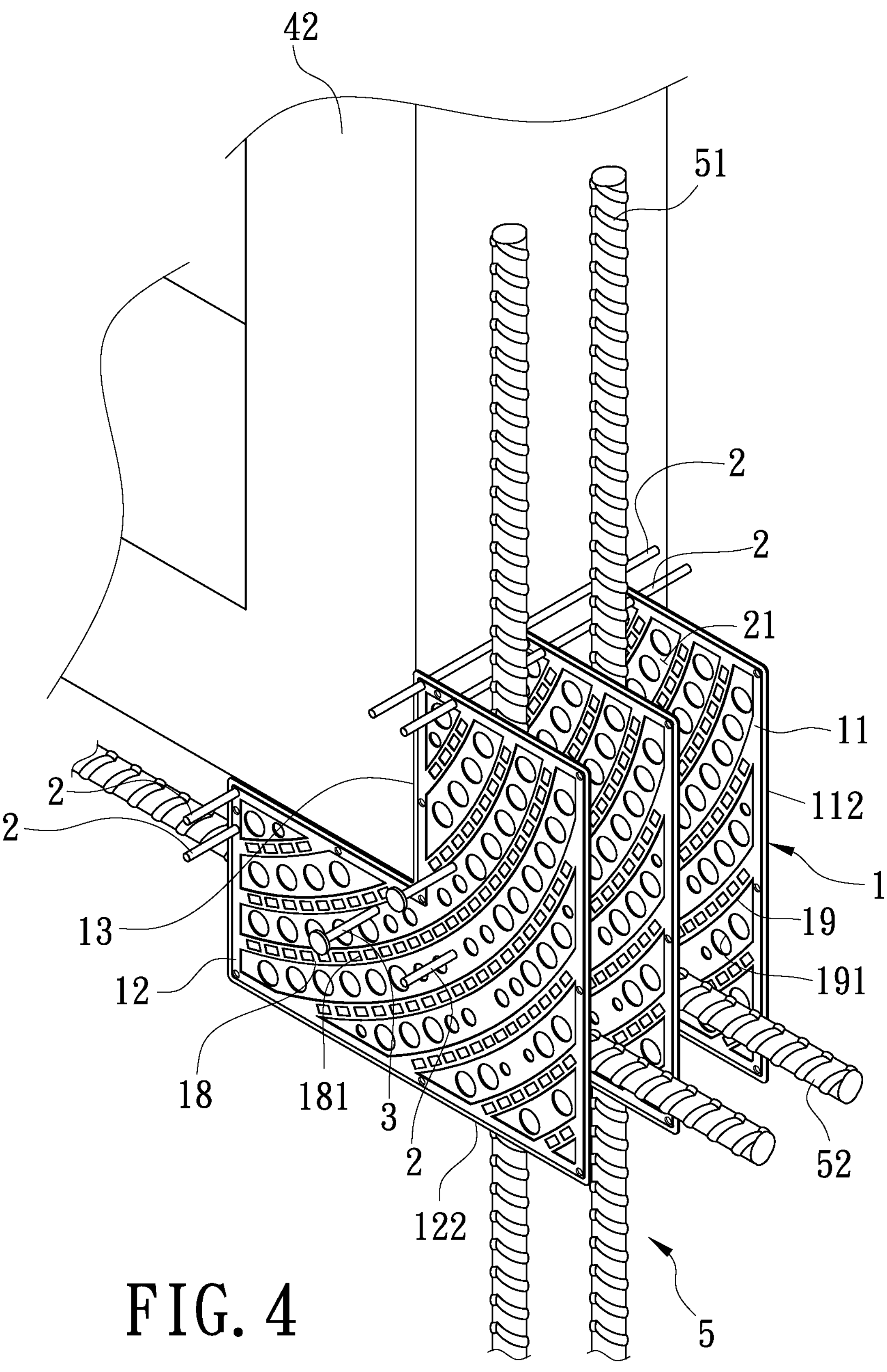
FIG. 4 is a perspective view of steel bars mounted on the anti-cracking assembly structure for door and window corner wall according to the present invention.

Thus, referring to FIG. 4, when several assembly structures of the present invention are respectively nailed on the formwork and fixed at the corners of the door and window frames (41) and (42), several steel bars (5) are arranged longitudinally and laterally around the door and window frames (41) and (42). During the construction, the longitudinal steel bars (51) and the lateral steel bars (52) may be directly inserted into a steel bar resting area (21) formed between the adjacent fixing rods (2) through outer edges (112) and (122) of the first piece portion (11) and the second piece portion (12) of the anti-cracking components (1) respectively, and the longitudinal steel bars (51) and the lateral steel bars (52) abut against the fixing rods (2) respectively, so as to enhance the convenience in arranging the steel bars (5), and avoid the trouble for construction personnel in climbing the ladder frame and passing through the steel bars (5) from top to bottom. Then, iron wires are utilized at the intersections of the longitudinal steel bars (51) and the lateral steel bars (52) to bound and fix the arrangement of the steel bars (5).

Afterwards, the ready-mixed concrete is injected into the space defined by the formworks. At this moment, the liquid concrete can flow among the anti-cracking components (1) through the through holes (191) of the anti-cracking components (1), and be conducted through the arc-shaped protruding ribs (18) and arc-shaped grooves (19) on the surface of the anti-cracking components (1), which enhance the smoothness of the flow of the concrete on the surface of the anti-cracking components (1), and reduces the contact dead angle with the anti-cracking components (1), so that the concrete can completely cover the surface of the anti-cracking components (1). When the concrete covers the surface of the anti-cracking components (1), the concrete will be filled and attached to the reinforcement dimples (181) arranged on the surface of the anti-cracking components (1). Thereby, after the concrete is solidified to form the wall structure, the wall structure will relatively form a plurality of convex columns correspondingly embedded in the reinforcement dimples (181) of the anti-cracking components (1), so as to greatly increase the gripping area and the bonding stability of the anti-cracking components (1) of the present invention and the wall structure, so that it is unlikely for the wall structure to have relative displacement or separation from the anti-cracking components (1).

Figure 5:
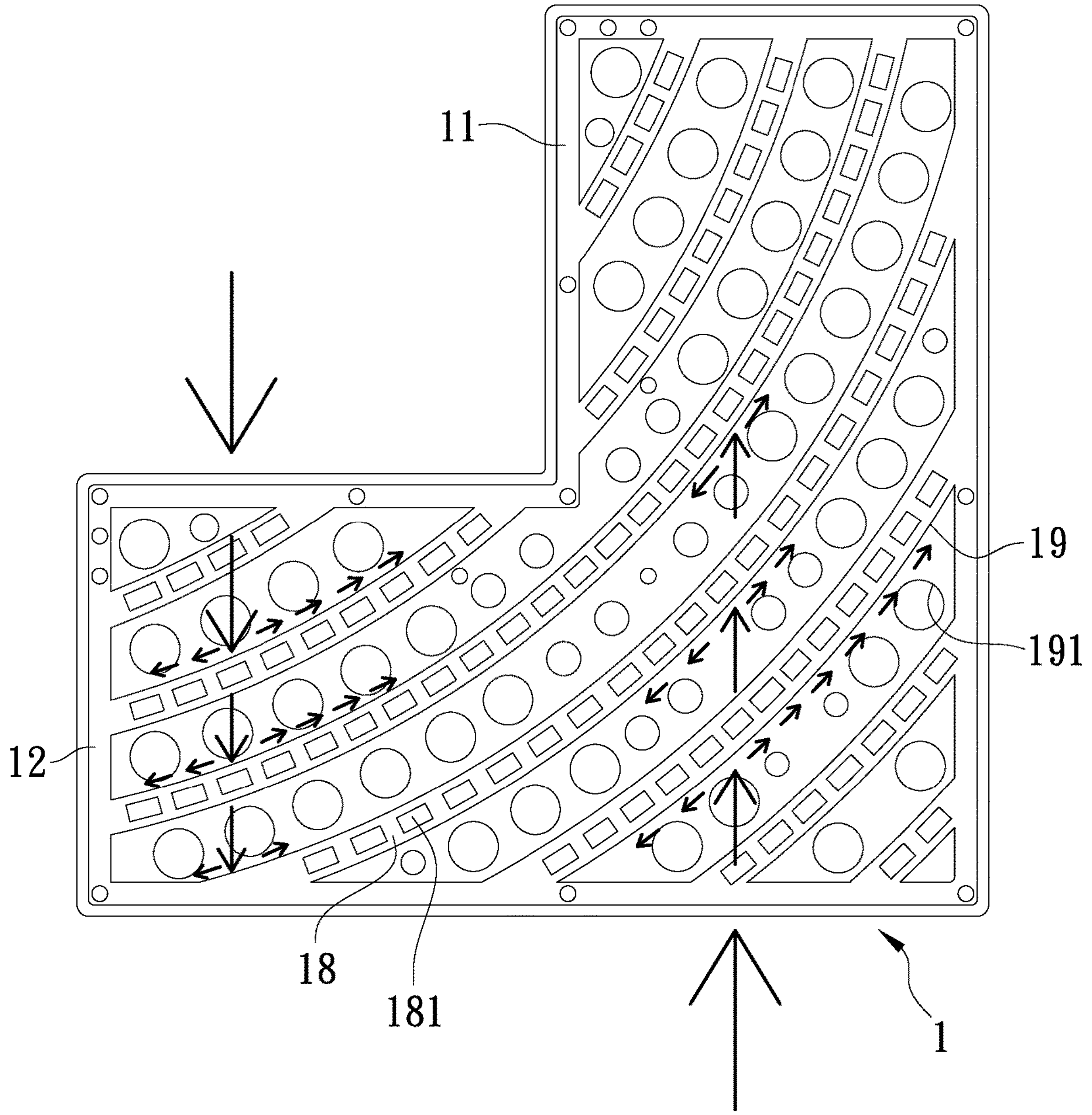
FIG. 5 is a perspective view of the state of the stress conduction and dispersion according to the present invention.
Figure 6:
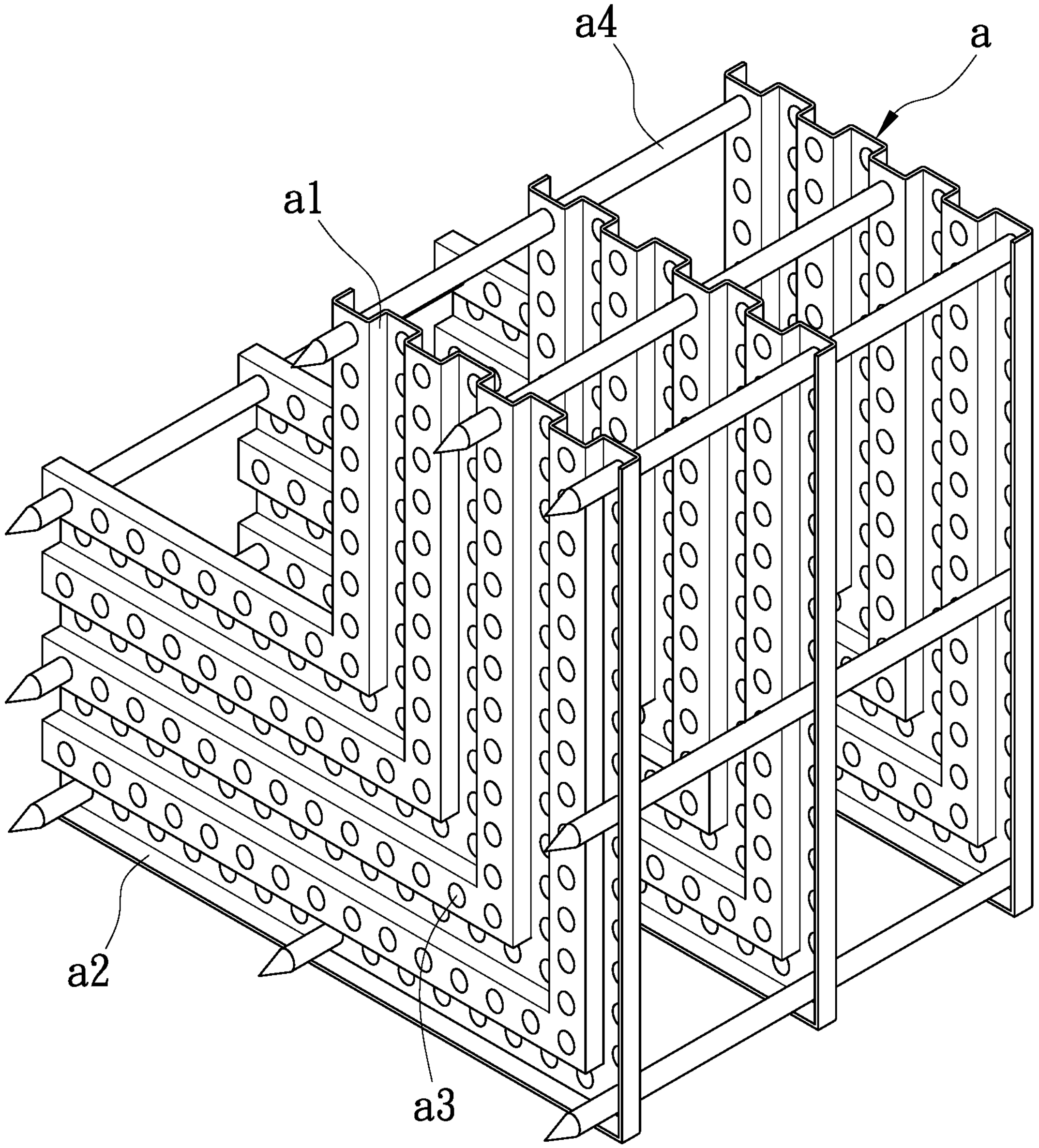
FIG. 6 (PRIOR ART)
FIG. 6 is a perspective view of an anti-cracking component for the structure of a window corner wall according to prior art.
Figure 7:
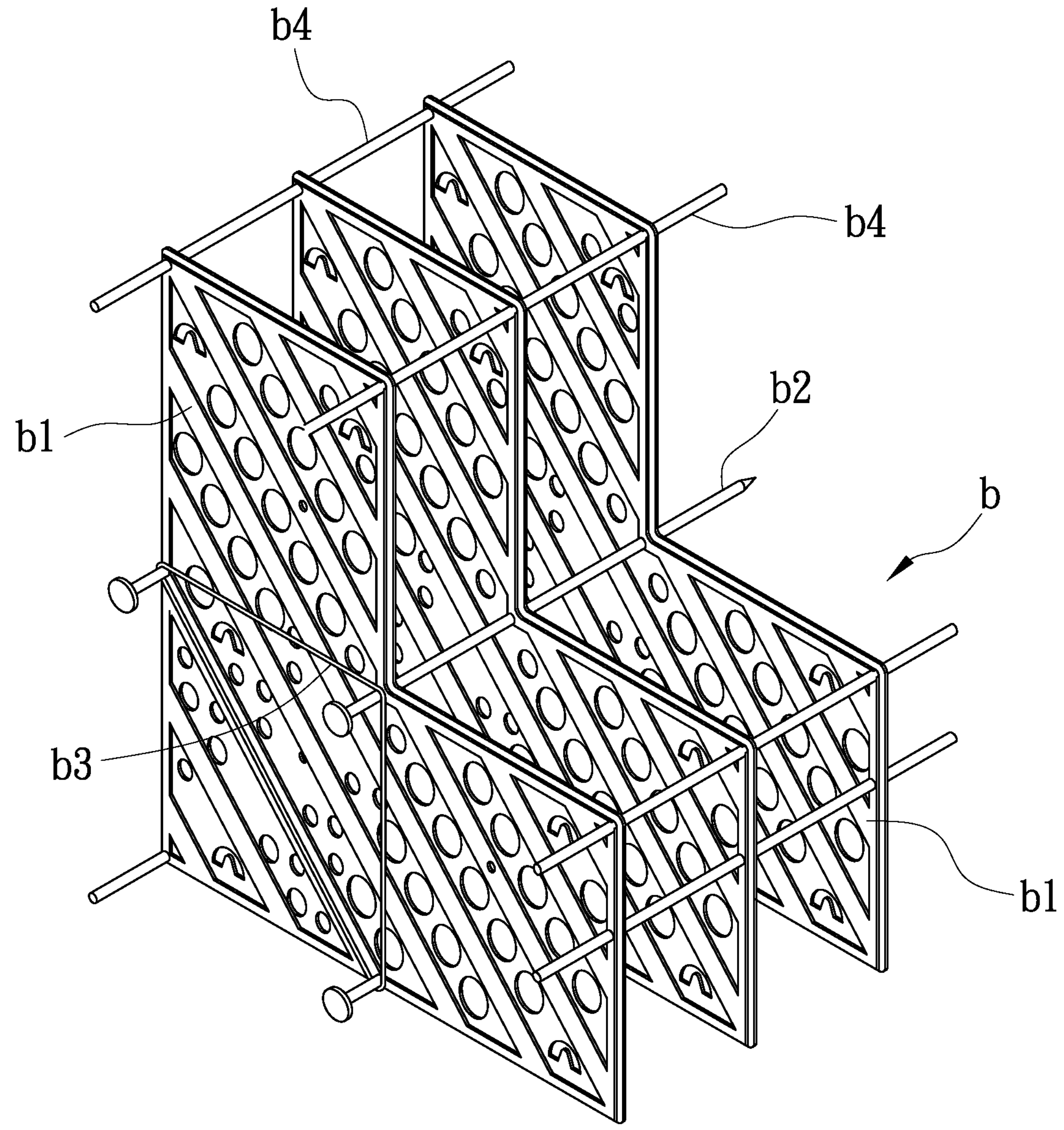
FIG. 7 (PRIOR ART)
FIG. 7 is a perspective view of a fixing structure for an anti-crack component for window corner wall according to prior art.
Figure 8:
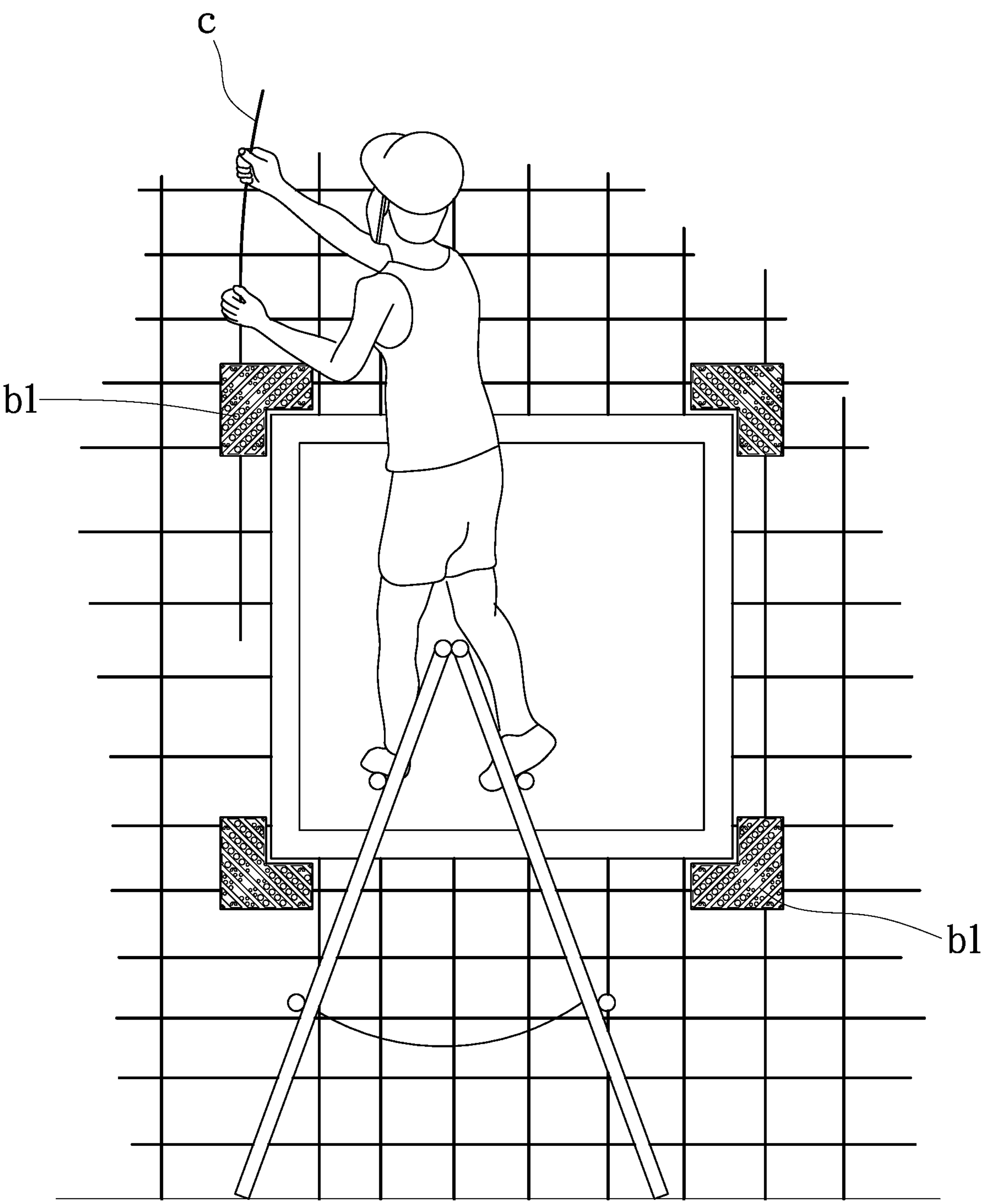
FIG. 8 (PRIOR ART)
FIG. 8 is a perspective view of steel bars mounting on an anti-crack component for window corner wall according to prior art.
Figure 9:
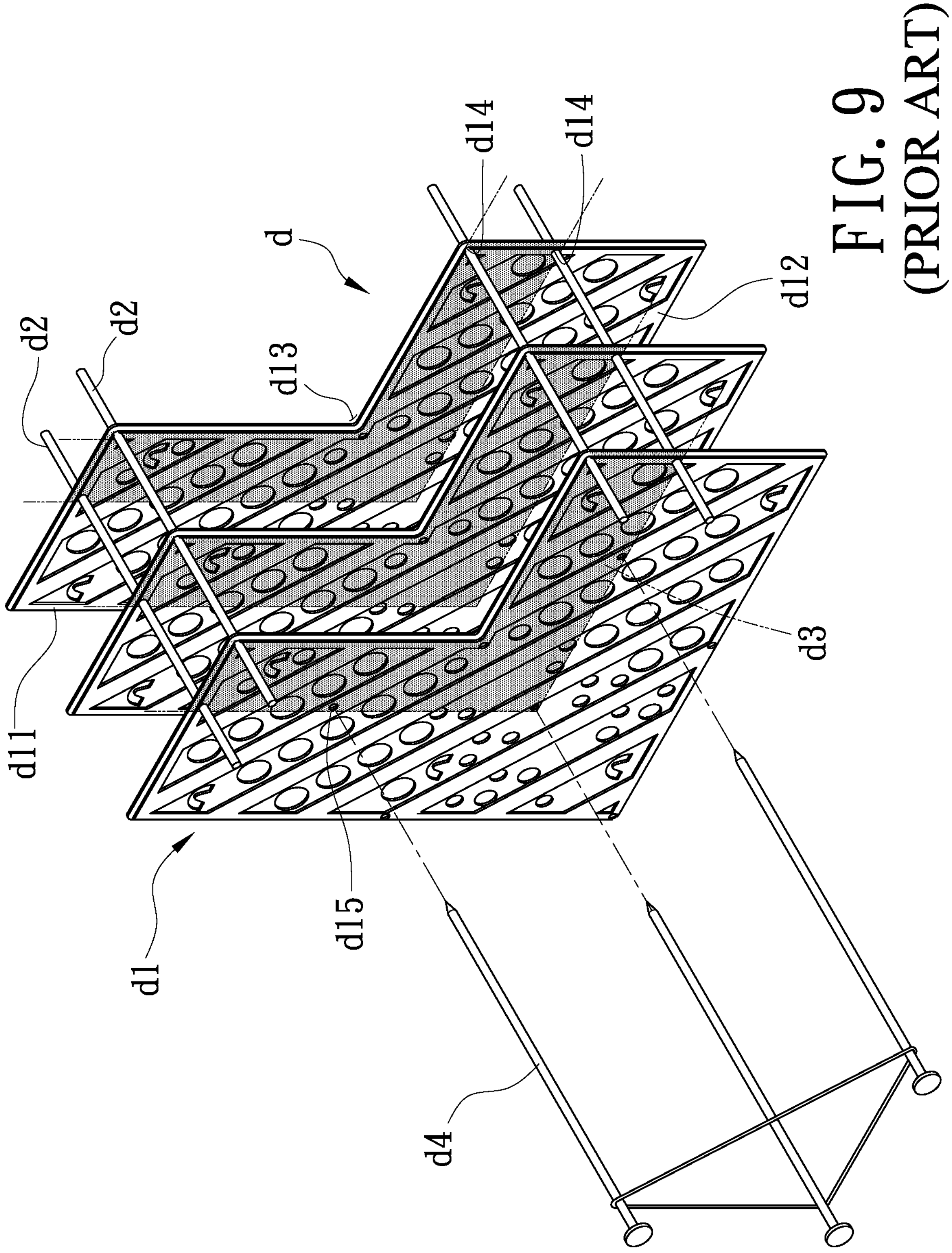
FIG. 9 (PRIOR ART)
FIG. 9 is an exploded view of an anti-cracking assembly structure for door and window corner wall according to prior art.
Figure 10:
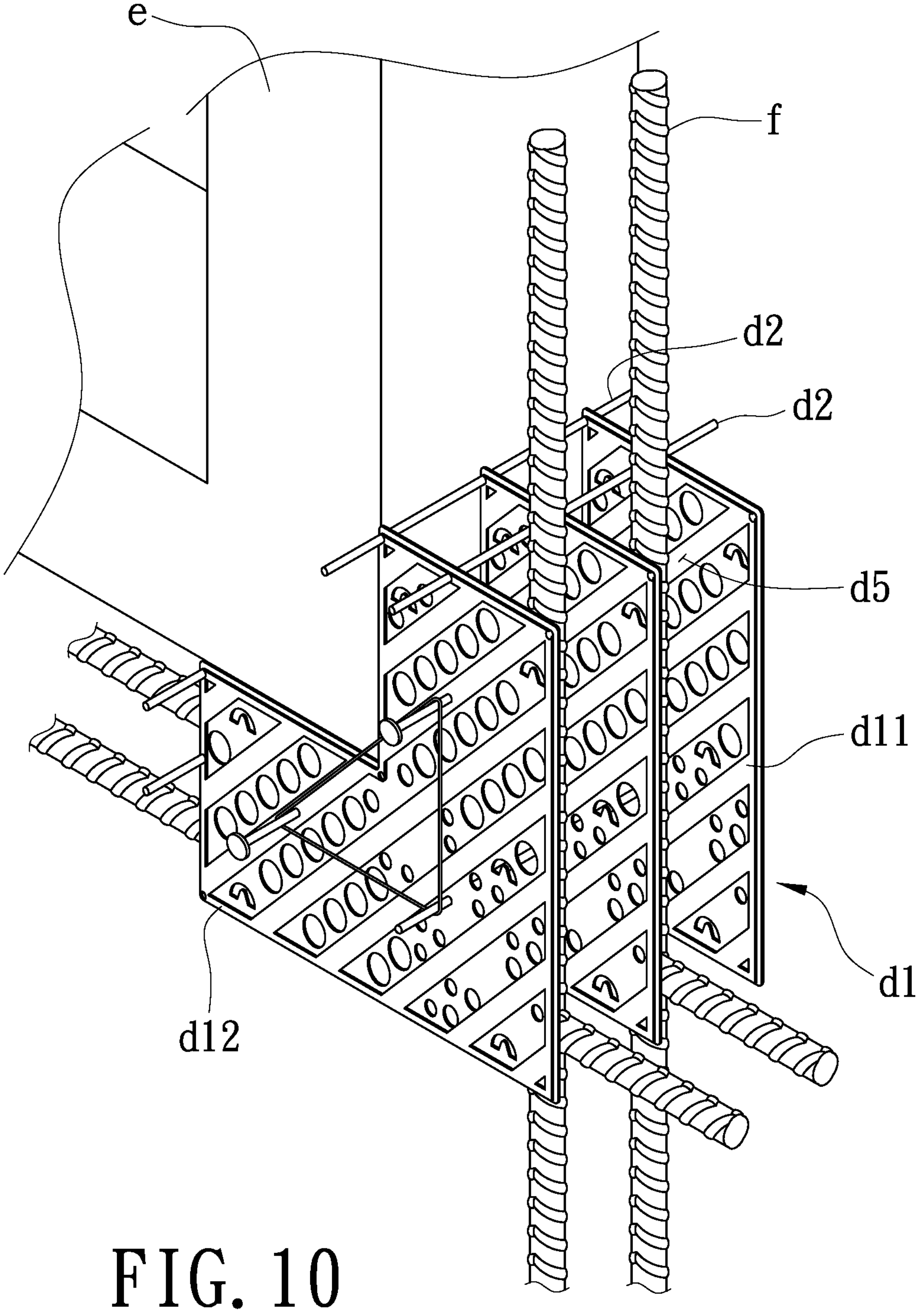
FIG. 10 (PRIOR ART)
FIG. 10 is a perspective view of steel bars mounted on the anti-cracking assembly structure for door and window corner wall according to prior art.

When the reinforced concrete (RC) wall is subjected to an external forces, such as earthquake shaking or thermal expansion and contraction, and stress is generated on the corner walls of the door and window frames (41) and (42), the strength and crack resistance of the wall structure can be enhanced by the stable combination of the wall structure at the corners of the door and the window frames (41) and (42) and the anti-cracking components (1), wherein the anti-cracking components (1) firmly combined with the wall structure absorbs the stress acting on the wall structure. Referring to FIGS. 5, the stress will be conducted through and along the plurality of arc-shaped protruding ribs (18) and arc-shaped grooves (19) on the surface of the anti-cracking components (1), so as to change the transmission direction of the force at the stress end, and disperse it more rapidly to the periphery of the anti-cracking components (1), so that the stress can be shared to and absorbed by the anti-cracking components (1). Accordingly, it not only prevents the anti-cracking components (1) from being twisted and deformed, but also prevents the wall structures of the door and window frames (41) and (42) from having 45-degree shear cracks at the corners. In addition, it is also facilitate to prevent cracks, micro-cracks, and etc. in the wall structure and surface paint layer at the corners of the doors and window frames (41) and (42).

It can be seen according to the above-mentioned structure and embodiments, advantages and effects provided by the present invention may include the following:

1. The anti-cracking assembly structure for door and window corner wall according to the present invention comprises a plurality of protruding ribs and grooves that are arc-shaped and spacingly arranged in parallel on the surface of each of the anti-cracking components. In this way, when the reinforced concrete wall is subjected to an external force and encounters stress generated at the corners of the door and window frames, the stress can be transmitted along the arc-shaped protruding ribs and grooves of each of the anti-cracking components, which change the transmission direction of the force at the stress end, and transmit the force to the peripheral side more quickly, so as to effectively prevent the occurrence of 45-degree shear cracks at the corners of the wall structure of the door and window frames.
2. The anti-cracking assembly structure for door and window corner wall according to the present invention comprises a plurality of protruding ribs and grooves that are arc-shaped and spacingly arranged in parallel on the surface of each of the anti-cracking components. In this way, when a stress generated at the corner of the door and window frames acts on the anti-cracking components, the conduction design of the arc-shaped protruding ribs and grooves of the anti-cracking components can quickly disperse the stress generated at the corner of the door and window frames to the periphery thereof so as to avoid the distortion and deformation of the anti-cracking components. It can also prevent cracks or micro-cracks in the wall structure at the corner of the door and window frames and surface paint layer thereof.
3. The anti-cracking assembly structure for door and window corner wall according to the present invention comprises a plurality of protruding ribs and grooves that are arc-shaped and spacingly arranged in parallel on the surface of each of the anti-cracking components. In this way, the conduction of the arc-shaped protruding ribs and grooves can facilitate the concrete to flow smoothly on the surface of the anti-cracking components and reduce its contact dead angle with the anti-cracking components, so as to increase the gripping area and binding tightness of the anti-cracking components and the wall structure, which further improves the structural strength and anti-cracking performance of the reinforced concrete wall.

What is claimed is:

1. An anti-cracking assembly structure for door and window corner wall, comprising:

a plurality of anti-cracking components, arranged at intervals and corresponding to each other, wherein each of the anti-cracking components has a first piece portion arranged longitudinally, a second piece portion arranged laterally, a notch jointly formed on one side of the first piece portion and the second piece portion, and at least two adjacent fixing holes respectively arranged at end edges of the first piece portion and the second piece portion at the side of the notch, wherein the first piece portion and the second piece portion are perpendicularly connected and integrally formed;

a plurality of fixing rods, each fixing rod penetrating and being secured in a respective one of the fixing holes correspondingly arranged in the first piece portion and the second piece portion of each of the anti-cracking components, wherein the first piece portion has two virtual longitudinal sidelines defined thereon to respectively pass through a corresponding one of two of the plurality of fixing rods longitudinally, wherein the second piece portion has two virtual lateral sidelines defined to respectively pass through a corresponding one of another two of the plurality of fixing rods laterally, wherein each of the anti-cracking components has an operation area defined respectively between the two virtual longitudinal sidelines and the two virtual lateral sidelines and the end edges of the first and second piece portions, wherein the operation area has at least one positioning hole formed therein; and at least one positioning rod being inserted through the at least one positioning hole of the anti-cracking components that are correspondingly arranged, and fixed on a formwork, wherein each of the anti-cracking components has a plurality of protruding ribs and grooves formed on a surface thereof, wherein each of the grooves is formed between two adjacent protruding ribs so that the protruding ribs are arranged in spaced relationship, wherein the protruding ribs and the grooves are formed in a circular arc contour with increasing diameters from inner end edges of the of the first piece portion and the second piece portion to an interface between outside edge portions of the first piece portion and the second piece portion, and arranged concentrically each with respect to the others, and wherein each of the ribs has a plurality of reinforcement dimples formed in angularly spaced relationship therein along the circular arc contour thereof, and each of the grooves has a plurality of through holes formed therethrough and arranged in angularly spaced relationship along the circular arc contour thereof.

2. An anti-cracking component of anti-cracking assembly structure for door and window corner wall, comprising a first piece portion, longitudinally arranged thereon, a second piece portion, laterally arranged thereon, and a notch jointly formed on one side of the first piece portion and the second piece portion, wherein the first piece portion and the second piece portion are perpendicularly connected and integrally formed, the anti-cracking component further includes a plurality of protruding ribs and grooves formed on a surface thereof, wherein each of the grooves is formed between two adjacent protruding ribs so that the protruding ribs are arranged in spaced relationship one from another, wherein the protruding ribs and the grooves are formed in a circular arc contour with increasing diameters from an inner end portion thereof to an outer end portion thereof, and arranged concentrically each with respect to the others, and wherein each of the ribs has a plurality of reinforcement dimples formed in angularly spaced relationship therein along the circular arc contour thereof.

3. The anti-cracking component of anti-cracking assembly structure for door and window corner wall as claimed in claim 2, wherein the grooves of each of the anti-cracking components respectively have a plurality of through holes formed therethrough and arranged in angularly spaced relationship along the circular arc thereof.

4. The anti-cracking component of anti-cracking assembly structure for door and window corner wall as claimed in claim 2, wherein the anti-crack component further comprises at least two adjacent fixing holes, respectively arranged at end edges of the first piece portion and the second piece portion at the side of the notch, and at least one positioning hole arranged therein.

5. The anti-cracking component of anti-cracking assembly structure for door and window corner wall as claimed in claim 4, wherein the first piece portion of each of the anti-cracking components has two virtual longitudinal sidelines defined thereon to respectively pass through a corresponding one of two fixing holes longitudinally, wherein the second piece portion has two virtual lateral sidelines defined thereon to respectively pass through the two fixing holes laterally, wherein each of the anti-cracking components has an operation area defined respectively between the two virtual longitudinal sidelines and the two virtual lateral sidelines and the end edges of the first and second piece portions, wherein the operation area has at least one positioning hole formed therein.

* * * * *